(12) United States Patent
Ishizawa et al.

(10) Patent No.: US 7,492,538 B2
(45) Date of Patent: Feb. 17, 2009

(54) CAMERA MODULE

(75) Inventors: Takashi Ishizawa, Yamagata (JP); Tomohiko Osaka, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 0 days.

(21) Appl. No.: 11/846,380

(22) Filed: Aug. 28, 2007

(65) Prior Publication Data

US 2008/0055752 A1    Mar. 6, 2008

(30) Foreign Application Priority Data

Aug. 31, 2006   (JP)   ............................ 2006-236885

(51) Int. Cl.
    *G02B 7/02*   (2006.01)
(52) U.S. Cl. ................................... 359/824
(58) Field of Classification Search .......... 359/811–824
    See application file for complete search history.

(56) References Cited

U.S. PATENT DOCUMENTS

| | | | |
|---|---|---|---|
| 5,210,644 A | | 5/1993 | Nomura |
| 5,572,372 A | | 11/1996 | Sekine |
| 6,097,552 A | * | 8/2000 | Gordon et al. ............. 359/814 |
| 2006/0153556 A1 | | 7/2006 | Lee |
| 2006/0245085 A1 | * | 11/2006 | Lee et al. ............... 359/813 |

FOREIGN PATENT DOCUMENTS

| | | | |
|---|---|---|---|
| JP | 2004280031 A | * | 10/2004 |
| JP | 2006050694 A | | 2/2006 |

\* cited by examiner

*Primary Examiner*—Ricky L Mack
*Assistant Examiner*—Vipin M Patel
(74) *Attorney, Agent, or Firm*—Marger Johnson & McCollom, P.C.

(57) ABSTRACT

A camera module having a holder including a leans unit and upper and lower leaf springs for displaceably supporting is provided. Each of the leaf springs has an outer annular portion, an inner annular portion, and bridge portions couple between the outer annular portion and the inner annular portion for resiliently support the inner annular portion with respect to the outer annular portion. The inner annular portion of the lower leaf spring is attached to an lower cylindrical end portion of the holder mechanically and reliably, and the inner annular portion of the upper leaf spring is attached to the upper cylindrical end portion of the holder in a state that the inner annular portion is fixedly held between an upper cylindrical end portion of the holder and a stopper. According to the camera module having the above structure, since the bonding operating using a synthetic resin that was performed in the conventional camera module can be omitted, it is possible to shorten a time necessary for manufacturing a camera module.

6 Claims, 10 Drawing Sheets

CAMERA MODULE

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Prior Art

A camera module having a function of displacing a lens unit in a direction of an optical axis of the lens unit is used in relatively small-sized digital cameras, camera-equipped cellular phones and the like. This function is used for providing an autofocus function and/or zoom function and the like, and is achieved by an interaction between a magnetic field generated by an electrical current flowing in a coil and a magnetic field generated by a yoke and magnets provided on the yoke.

Such a camera module includes a barrel which holds the lens unit, a holder which houses the barrel therein, and a pair of leaf springs for supporting the holder so that the holder is displaceable in a direction of an optical axis of the lens unit.

FIG.10 is an exploded perspective view of an autofocus actuator assembly 100 used in a conventional camera module for displacing a lens unit 115 in a direction of an optical axis thereof. It is to be noted that an imaging element 117 on substrate 116 is provided below a base 111 of the actuator assembly 100.

A holder 108 that houses a barrel (not shown) holding the lens unit is provided between a cover 101 and the base 111 so that the holder 108 is displaceable in a direction of an optical axis of the lens unit together with the lens unit.

A ring-shaped inner annular portion 104b of an upper leaf spring 104 and a ring-shaped inner annular portion 110b of a lower leaf spring 110 are attached to the upper and lower cylindrical end portions of the holder 108, respectively, using an adhesive. Further, a ring-shaped outer annular portion 104a of the upper leaf spring 104 is attached to a top surface of a yoke 105 which is mounted on the base 111 and a ring-shaped outer annular portion 110a of the lower leaf spring 110 is attached to the base 111, respectively.

Three bridge portions 104c are coupled between the outer annular portion 104a and the inner annular portion 104b of the upper leaf spring 104. As is the same with the upper leaf spring 104, three bridge portions 110c are coupled between the outer annular portion 110a and the inner annular portion 110b of the upper leaf spring 110. By resilient deformation of the respective three bridge portions 104c and 110c, the holder 108 can be displaced in a direction of an optical axis of the lens unit.

A plurality of magnets 106 are provided on the yoke 105 so as to produce a magnetic field. The yoke 105 has an axial bore 105a for receiving the holder 108. Further, a coil 107 is provided around an outer periphery of the holder 108 so that the coil 7 is disposed in the magnetic field produced by the magnets and the yoke 105 in a state that the holder 108 is received in the axial bore 105a. By supplying a current to the coil 107 to generate a magnetic field, the holder 108 can be displaced in a direction of an optical axis of the lens unit by a driving force generated by the interaction of the magnetic fields. In this regard, it is to be noted that a component denoted by the reference numeral 103 is a flexible printed circuit board used for supplying a current to the coil 107, a component denoted by the reference numeral 102 is a stopper arranged above the upper surface of the inner annular portion of the upper leaf spring 104, and a component donated by the reference numeral 109 is a ring-shaped plate provided between the lower leaf spring 110 and the bottom surface of the yoke 105.

It is to be noted that an actuator assembly similar to the actuator assembly 100 having such upper leaf spring 104 and lower leaf spring 110 described above is disclosed in JP-A-No.2004-280031.

As described above, the upper leaf spring 104 and the lower leaf spring 110 are bonded to the upper and lower cylindrical end portions of the holder 108, respectively, using an adhesive. In this case, a synthetic resin (e.g. epoxy resin) is used as the adhesive. Such a synthetic resin is applied onto an end surface of each of the upper and lower cylindrical portions of the holder 108 by hand of a worker. However, the width of the end surface of the cylindrical end portion is extremely narrow. Therefore, an application of the synthetic resin to the end surface must be carried out carefully, and thus there is a problem in that a time required for the application operation cannot be shortened. Further, an additional time is required for waiting the hardening of the applied synthetic resin, that is, it is necessary to leave the holder 108 to which the synthetic resin has been applied as it is for a certain period of time after completion of the application of the synthetic resin. This leads to another problem in that a time required for manufacturing the camera module cannot be shortened.

Furthermore, in the case where a bonding area, that is an area of the end surface of the holder is extremely small, or in the case where a bonding condition of the synthetic resin against the inner annular portion of the leaf spring is not sufficient, it is not possible to ensure a sufficient bonding strength therebetween. In such a case, there is a problem in that the upper leaf spring 104 and/or the lower leaf spring 110 may be partially peeled off from the holder 108 due to the reduced bonding force in the event that the electronic apparatus equipped with the camera module is dropped by accident.

SUMMARY OF THE INVENTION

The present invention has been made in view of the problems described above, and therefore it is an object of the present invention to provide a camera module in which leaf springs can be attached to a holder easily and reliably.

In order to achieve the object, the present invention is directed to a camera module, which comprises: a lens unit which constitutes an optical system of the camera module; a holder which houses the lens unit and is displaceable along an optical axis direction of the lens unit, the holder having a cylindrical shape having upper and lower cylindrical end portions; a coil provided on the holder; a yoke and magnets provided on the yoke for providing a magnetic field to the coil; upper and lower leaf springs for supporting the holder so that the holder is displaceable along an optical axis direction of the lens unit, each of the upper and lower springs including an outer annular portion, an inner annular portion provided inside the outer annular portion and attached to one of the cylindrical end portions of the holder, and a plurality of bridge portions coupled between the outer annular portion and the inner annular portion for displaceably supporting the inner annular portion with respect to the outer annular portion, each of the bridge portions having an inner annular portion side end portion coupled to an outer periphery of the inner annular portion; and an imaging element provided below the lens unit. In this camera module, at least one of the inner annular portions of the upper and lower leaf springs is attached to the corresponding cylindrical end portion of the holder through an attachment means which is configured so that the inner annular portion is mechanically engaged with and attached to the cylindrical end portion of the holder.

According to the camera module of the present invention having the above structure, since the bonding operating of the upper and lower spring for the upper and lower cylindrical end portions of the holder using a synthetic resin that was performed in the conventional camera module can be omitted, it is possible to shorten a time necessary for manufacturing a camera module.

In the camera module of the present invention, it is preferred that the inner annular portion of the lower leaf spring is attached to the lower cylindrical end portion of the holder through the attachment means, wherein the attachment means includes: a first means for engaging the inner annular portion of the lower leaf spring with the lower cylindrical end portion of the holder so that the inner annular portion does not rotate with respect to the holder in one of circumferential directions thereof, and a second means for holding the inner annular portion of the leaf spring against the holder so that the inner annular portion does not move in a direction parallel to the optical axis direction of the lens unit as well as does not rotate in the other circumferential direction in a state that the first means is in an engaged state.

Further, in the camera module of the present invention, it is preferred that the lower cylindrical end portion of the holder is formed with a step so as to form a small cylindrical portion for receiving the inner annular portion and an end surface for supporting an upper surface of the inner annular portion, wherein the first means includes notches and tongues formed in the outer periphery of the inner annular portion of the lower leaf spring and protrusions formed on the end surface of the lower cylindrical end portion so as to be engageable with the respective tongues by rotating the lower leaf spring, and wherein the second means include holding means provided on the lower cylindrical end portion of the holder for holding the inner annular portion side end parts of the respective bridge portions of the leaf spring from the bottom thereof in a state that the upper surface of the inner annular portion is supported on the end surface of the step and for restricting further rotation of the lower leaf spring in a state that the protrusions are engaged with the tongues.

Furthermore, in the camera module of the present invention, it is preferred that wherein each of the protrusions has a slant surface for raising the tongue according to the rotation of the lower leaf spring, and each of the holding means includes a protruding portion formed on the outer circumferential surface of the lower cylindrical end portion and a holding arm horizontally protruding from a tip part of the protruding portion for holding the inner annular portion side end part of the bridge portion of the lower leaf spring.

Furthermore, in the camera module of the present invention, it is preferred that the inner annular portion of the upper leaf spring is attached to the upper cylindrical end portion of the holder through the attachment means, wherein the attachment means comprises a ring-shaped member detachably attached to the upper cylindrical end portion of the holder, and the ring-shaped member is configured so that that the inner annular portion of the upper leaf spring is fixedly held between an end surface of the upper cylindrical end portion of the holder and an inner surface of the ring-shaped member when the ring-shaped stopper is attached to the upper cylindrical end portion of the holder.

Furthermore, in the camera module of the present invention, it is preferred that the ring-shaped member has an inner circumferential surface, wherein the inner circumferential surface of the ring-shaped member is formed with a plurality of engaging means, and the lower cylindrical end portion of the holder has a plurality of engaged means to which the engaging means of the ring-shaped are engaged by rotating the ring-shaped member with respect to the holder.

Furthermore, in the camera module of the present invention, it is preferred that each of the engaging means includes a notch formed in the circumferential surface and a step provided in association with the notch, and each of the engaged means includes a protruding piece protruding upwardly from the upper cylindrical end portion of the holder and an engaging rib extending from a tip part of the protruding piece, wherein the notches receive the protruding pieces with the engaging ribs when the ring-shaped member is placed onto the upper end cylindrical portion of the holder, and then by rotating the ring-shaped member in a predetermined direction the engaging ribs of the holder are engaged with the respective steps of the ring-shaped member.

Moreover, in the camera module of the present invention, it is preferred that the ring-shaped member is a stopper for restricting excessive displacement of the holder in an upward direction.

The above and other objects, features and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
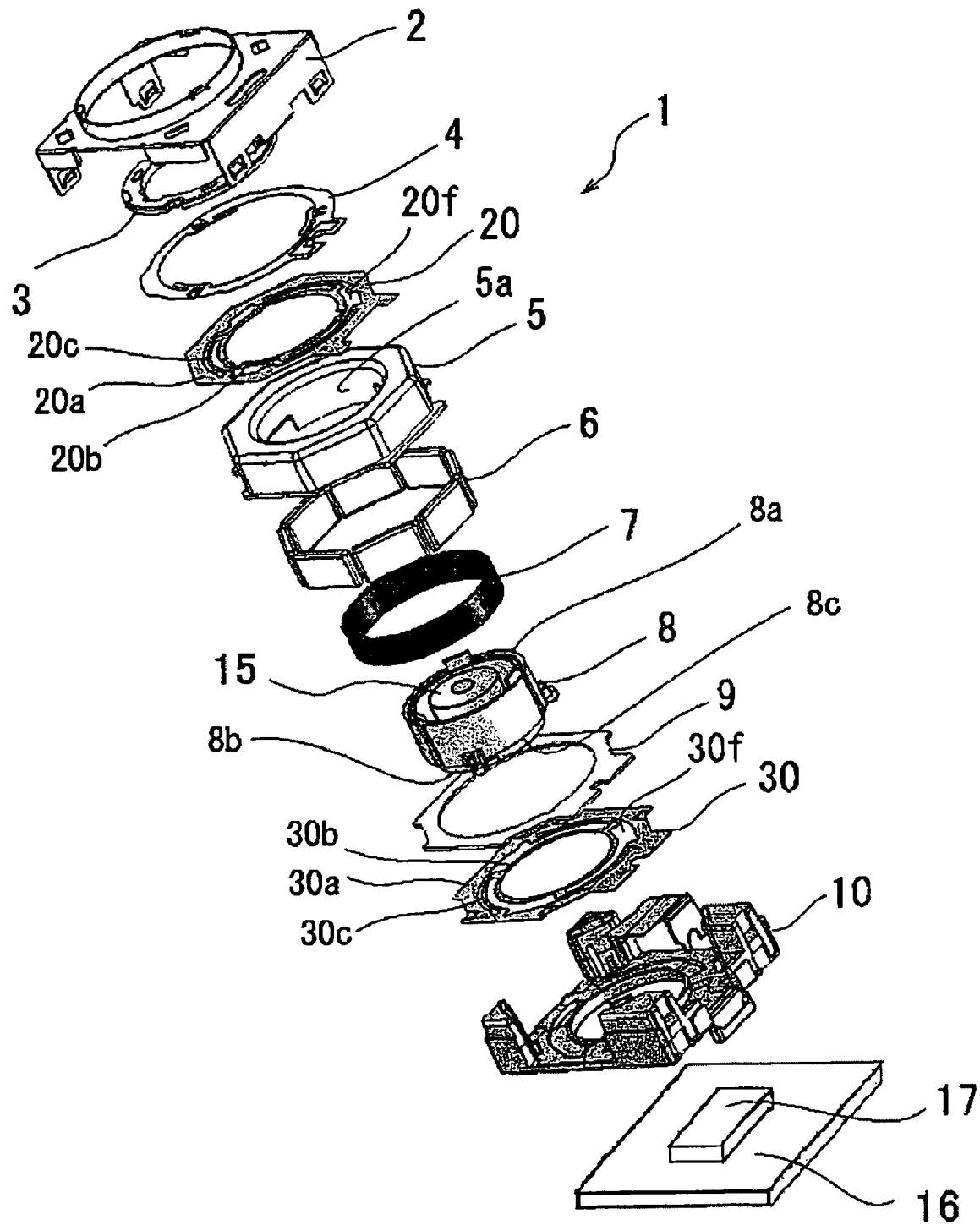
FIG. 1 is an exploded perspective view of an actuator assembly 1 of a camera module of an embodiment according to the present invention.
Figure 2:
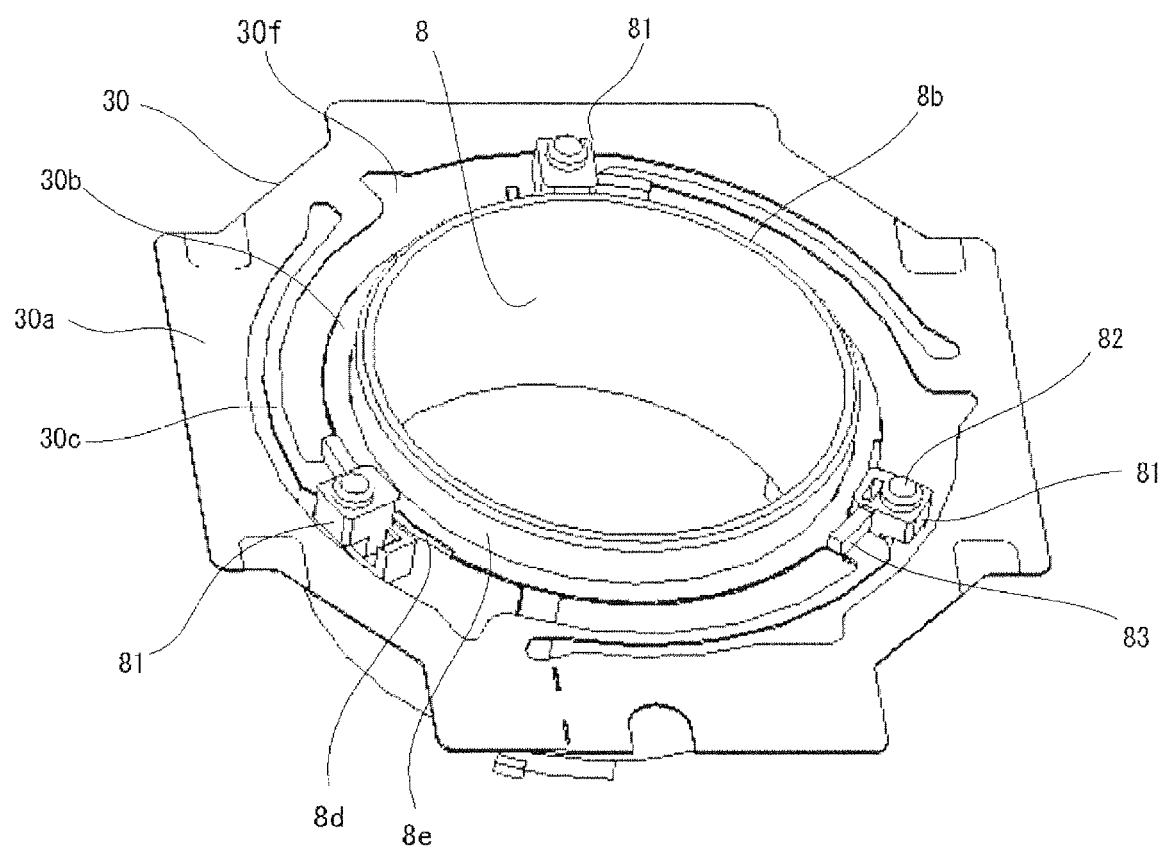
FIG. 2 is a perspective view which shows an engagement state of a holder 8 and a lower leaf spring 30 of the actuator assembly 1 of the camera module shown in FIG. 1.

A camera module according to an embodiment of the present invention will be described below with reference to the accompanying drawing.

The camera module according to the embodiment comprises: a lens unit 15 which constitutes an optical system of the camera module; a holder 8 which houses the lens unit 15 and is displaceable along an optical axis direction of the lens unit 15, the holder 8 having a cylindrical shape having upper and lower cylindrical end portions 8a and 8b; a coil 7 provided on the holder 8; a yoke 5 and magnets 6 provided on the yoke 5 for providing a magnetic field to the coil 7; upper and lower leaf springs 20, 30 for supporting the holder 8 so that the holder 8 is displaceable along an optical axis direction of the lens unit 15, each of the upper and lower springs 20, 30 including an outer annular portion 20a (30a), an inner annular portion 20b (30b) provided inside the outer annular portion 20a, (30a) and attached to one of the cylindrical end portions 8a (8b) of the holder 8, and a plurality of bridge portions 20c (30c) coupled between the outer annular portion 20a (30a) and the inner annular portion 20b (30b) for displaceably supporting the inner annular portion 20b (30b) with respect to the outer annular portion 20a (30a), each of the bridge portions 20c (30c) having an inner annular portion side end portion 20d (30d) coupled to an outer periphery of the inner annular portion 20b (30b); and an imaging element 17 mounted on a base substrate 16 and provided below the lens unit 15. In this camera module, at least one of the inner annular portions 20b (30b) of the upper and lower leaf springs 20, 30 is attached to the corresponding cylindrical end portion 8a, 8b of the holder 8 through an attachment means which is configured so that the inner annular portion (20b, 30b) is mechanically engaged with and attached to the cylindrical end portion (8a, 8b) of the holder 8. In the following description, both the upper and lower leaf springs 20, 30 are attached to the respective cylindrical end portions 8a, 8b by means of the attachment means, respectively. However, in the present invention, at least one of the upper and lower springs 20, 30 may be attached to the corresponding cylindrical end portion by means of the attachment means.

Hereinbelow, with reference to FIG. 1, description is made with regard to an actuator assembly 1 of the camera module of the embodiment according to the present invention. In this regard, it is to be noted that the imaging element 17 mounted on the base substrate 16 is disposed below the base 10.

The holder 8 that houses the barrel (not shown) holding the lens unit 15 is provided in a space defined between a cover 2 and the base 10 so that the holder 8 is displaceable in a direction of an optical axis of the lens unit 15.

As described below, the inner annular portion 20b of the upper leaf spring 20 is attached between an upper end surface of a cylindrical end portion 8a of the holder 8 and a bottom surface of a stopper 3 which is a ring-shaped member of the present invention. The stopper 3 is provided for restricting upwardly excessive displacement of the holder 8 by the abutment with the bottom surface of the cover 2 when the holder 8 is largely displaced. Further, as described below, the lower cylindrical end portion 8b of the holder 8 is formed with a step 8c to form an end surface 8d and a small cylindrical portion 8e. The inner annular portion 30b of the lower leaf spring 30 is attached to the step 8c in a state that an opening of the inner annular portion 30b is fitted onto the small cylindrical portion 8e of the holder 8.

The plurality of magnets 6 are bonded to the inner surface of the yoke 5 so as to produce a magnetic field. Further, the coil 7 is provided around an outer periphery of the holder 8 so that the coil 7 is disposed in the magnetic field generated by the magnets 6 and the yoke 5. The yoke 7 has an axial bore 8a for receiving the holder 8. The holder 8 displaceably supported by the upper and lower leaf springs 20, 30 can be displaced through the axial bore 8a in a direction of an optical axis of the lens unit 15 by supplying a current to the coil 7. It is noted that a component denoted by the reference numeral 4 is a flexible printed circuit board used for supplying a current to the coil 7, and a component denoted by the reference numeral 9 is a plate provided between the lower leaf spring 30 and the bottom surface of the yoke 5.

Next, with reference to FIG. 2 to FIG. 5, detailed description will be made with regard to the lower leaf spring 30 and the holder 8. In this regard, please note that the lower leaf spring 30 is attached to the holder 8 by means of the attachment means.

The lower leaf spring 30 is formed from a thin metal plate made of beryllium copper through a punching process and has the ring-shaped outer annular portion 30a and the ring-shaped inner annular portion 30b which is concentrically provided inside the outer annular portion 30a through a predetermined annular spacing 30f. The inner annular portion 30b is displaceably supported by the outer annular portion 30a through the bridge portions 30c. Each of the bridge portions 30c has an elongated arc-shape, and positioned inside the annular spacing 30f so that it extends along the inner periphery of the outer annular portion 30a and the outer periphery of the inner annular portion 30b through a predetermined angle. Further, each of the bridge portions 30c has the outer annular portion side base part coupled to the inner periphery of the outer annular portion 30a and the inner annular portion side base part 30d which is coupled to the outer periphery of the inner annular portion 30b.

In the inner periphery of the inner annular portion 30b, there are formed three notches 31 at locations near the respective inner annular portion side base parts 30d. Further, tongues 32 are also formed in the inner periphery of the inner annular portion 30b adjacent to the respective notches 31. The notches 31 and tongues 32 function as engaging means.

The holder 8 is a cylindrical member 8 made of a synthetic resin. As described above, the holder 8 has the lower end cylindrical portion 8b, and the step 8c is formed around the lower end cylindrical portion 8b to form the end surface 8d and the small cylindrical portion 8e. On the end surface 8d of the step 8c, three protrusions 30 which are engageable with the notches 31 are formed in a protruding manner (these protrusions 30 constitute "engaged means"). Each of the protrusions 80 is formed into a wedge shape having a slant surface 80a (see FIG. 5). Further, on the outer circumferential surface of the lower end cylindrical portion 8b, there are formed three protruding portions 81 through the same spacing so as to protrude outwardly. On the side potion of each of these protruding portions 81, there is formed a holding arm 83 for holding the inner annular portion side base part 30d of the bridge portion 30c of the lower leaf spring 30 in an optical axis direction of the lens unit. The holding arm 83 horizontally protrudes from a tip part of the protruding portion 81 and has a holding surface 84 for holding the upper surface of the inner annular portion side base part 30*d* of the bridge portion 30*c* (see FIG. 3). The protruding portions 81 and the holding arms 83 constitute holding means which serves as a holding means of the present invention in cooperation with the end surfaced 8*d* of the step 8*c* of the holder 8. In this regard, it is to be noted that projections denoted by the reference numeral 82 are contacting bosses against the base 10.

Next, description is made with regard to the operations for attaching the lower leaf spring to the holder 8.

Figure 3:
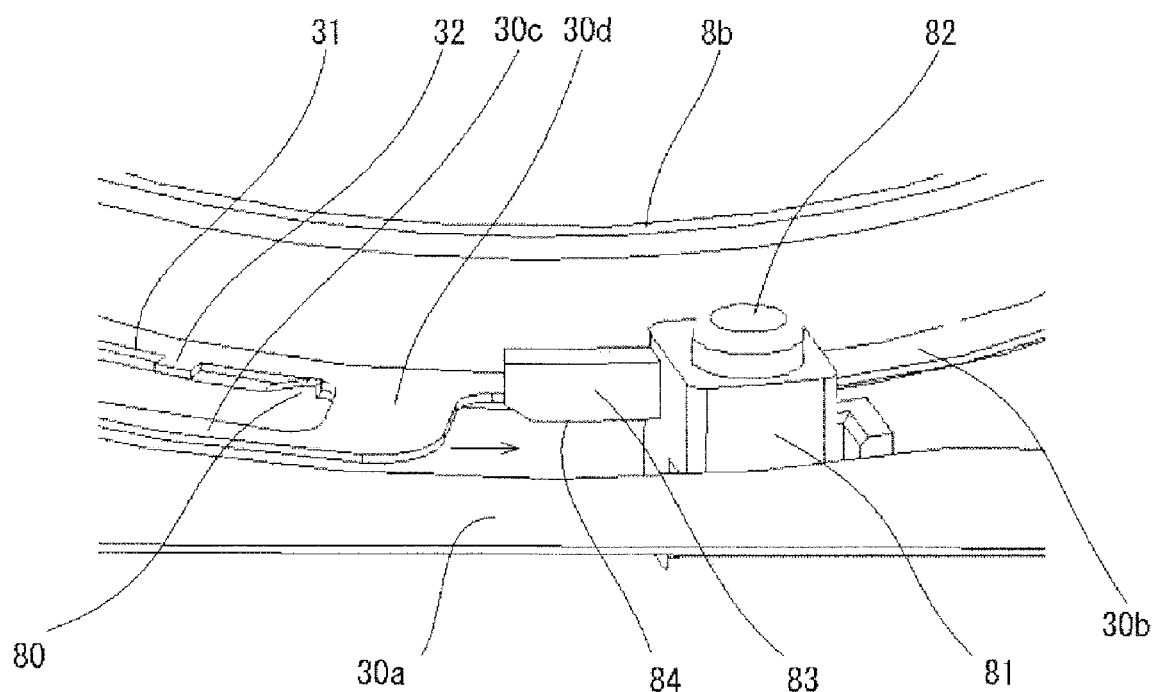
FIG. 3 is an enlarged perspective view which shows a state before the engagement of the holder 8 and the lower leaf spring 30 of the actuator assembly 1 of the camera module shown in FIG. 1.

First, as shown in FIG. 3, the inner annular portion 30*b* is fitted onto the small cylindrical portion 8*e* of the step 8*c* of the holder 8 in a state that the upper surface of the inner annular portion is supported by the end surface 8*d*. Then, the lower leaf spring 30 is rotated in a direction indicated by the arrow in FIG. 3. According to the rotation of the lower leaf spring 30, the upper surface of the inner annular portion side base part 30*d* of the bridge portion 30*c* is first held by the holding surface 84 of the holding arm 83 of the protruding portion 81 of the holder 8 so that displacement of the inner annular portion 30*b* in the optical axis direction is restricted.

When the lower spring is further rotated, each of the tongues 32 of the lower leaf spring 30 rides on the slant surface 80*a* of the corresponding protrusion 80 which protrudes from the end surface 8*d* of the step 8*c*. At this time, the tongue 32 and a part of the inner annular portion 30*b* near the tongue 32 is slightly deformed in a flex manner.

When the lower spring is further rotated, the tongue 32 rides out of the protrusion 80 completely. In this state, as shown in FIG. 4 and FIG. 5, the protrusion 80 is positioned inside the notch 31 in a state that the side portion of the tongue 32 and the side portion of the protrusion 80 is in abutment with each other, thereby restricting rotation of the lower spring 30 in an opposite rotation direction.

Figure 4:
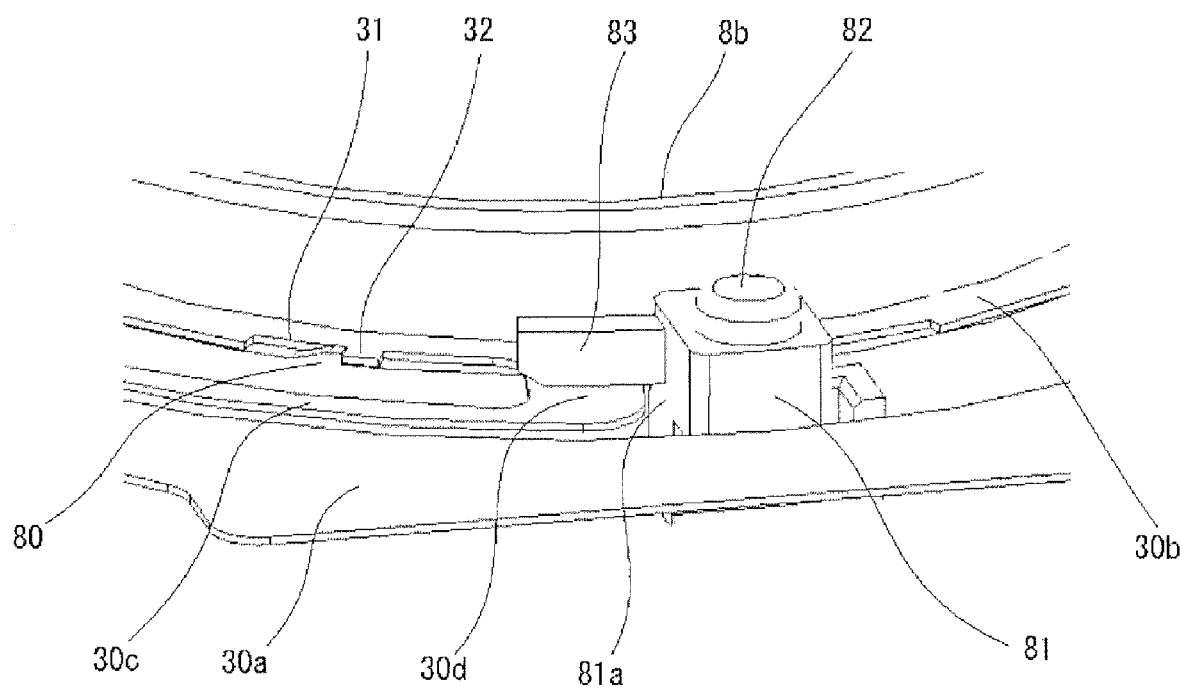
FIG. 4 is an enlarged perspective view which shows a state that the engagement of the holder 8 and the lower leaf spring 30 is established in the actuator assembly 1 of the camera module shown in FIG. 1.
Figure 5:
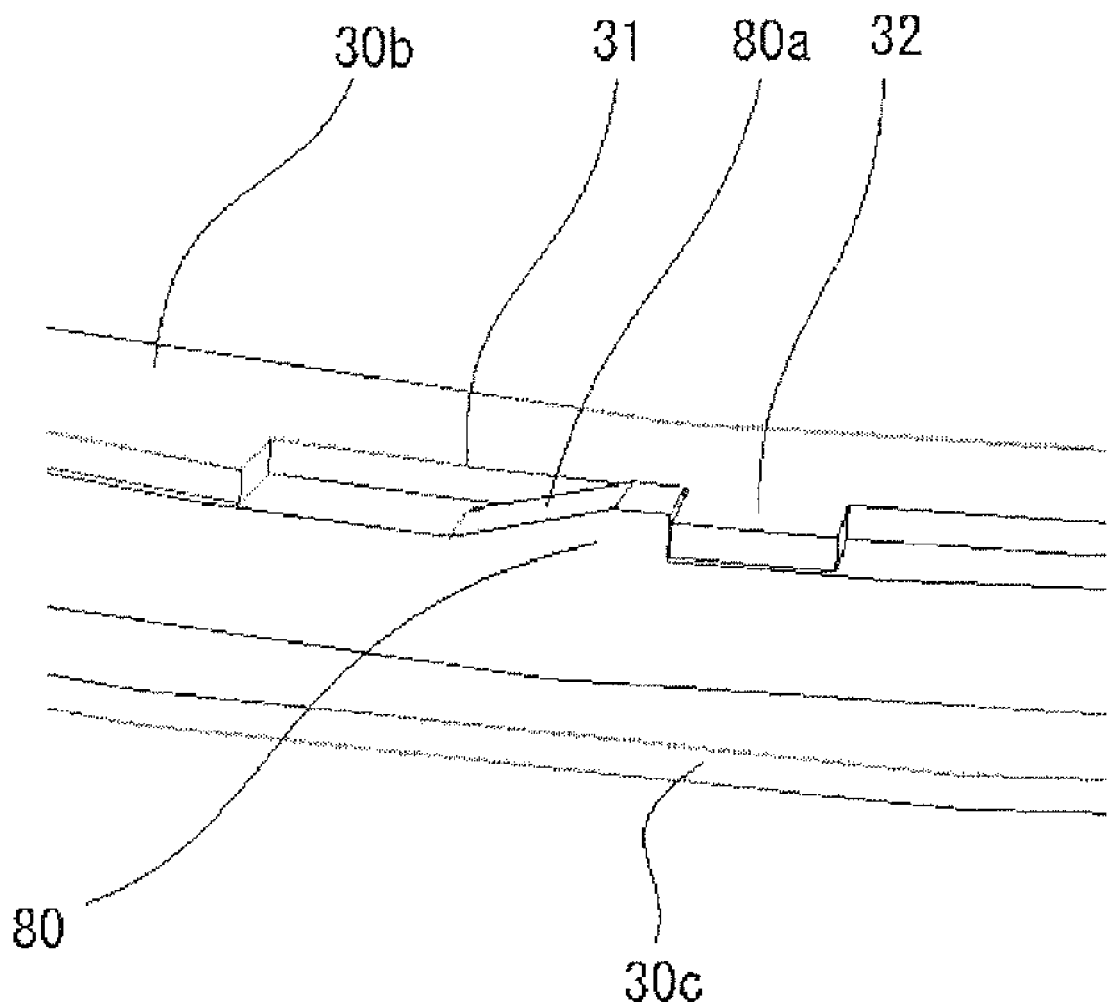
FIG. 5 is an enlarged perspective view which shows a state between a protrusion 80 of the holder 8 and a notch 31 of the lower leaf spring 30 of the actuator assembly 1 of the camera module shown in FIG. 1.
Figure 6:
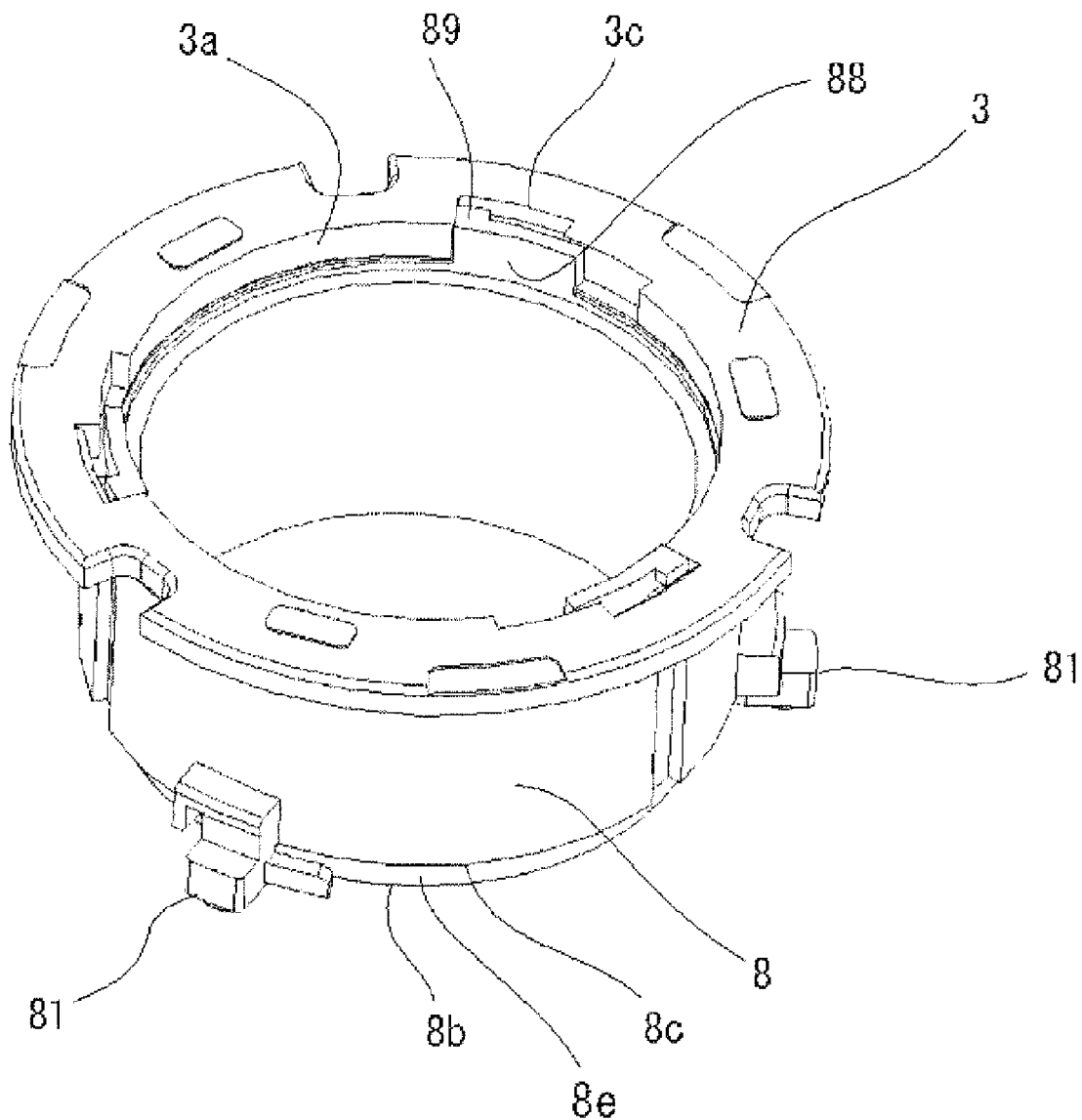
FIG. 6 is a perspective view which shows a state that a stopper 3 is in engagement with the holder 8, wherein this figure shows the engagement state therebetween viewed from the side of an upper cylindrical end portion 8a of the holder 8. Note that an upper leaf spring 20 is omitted from the figure for the purpose of clearly showing the engagement state between the stopper 3 and the holder 8.

On the other hand, as shown in FIG. 4, when the tongue 32 has ridden over the protrusion 80 and the protrusion 80 has been positioned inside the notch 81, the inner annular portion side base part 30*d* of the bridge portion 30*c* abuts against a side wall 81*a* of the protruding portion 81, thereby restricting further rotation of the lower leaf spring 30. In this sate, rotation of the lower spring 30 with respect to the holder 8 is completely restricted in both the circumferential directions, and displacement of the inner annular portion 30*b* of the lower leaf spring 30 in the optical axis direction is also restricted by the holding arm 83 and the end surface 8*d* of the step 8*c*. With this result, the lower leaf spring 30 is fixedly attached to the holder 8.

In this regard, please note that the reason why the notch 31 and the tongue 32 are formed near the inner annular portion side base part 30*d* of the bridge portion 30*c* is to close an engagement position by the inner annular portion side base part 30*d* of the bridge portion 30*c* and the holding arm 83 to an engagement position by the notch 31 and the protrusion 80. Namely, by effectively adding an engagement force of the engagement position by the inner annular portion side base part 30*d* of the bridge portion 30*c* and the holding arm 83 in the optical axis direction to an engagement force of the engagement position by the notch 31 and the protrusion 80, it is possible to make difficult that the protrusion 80 comes out of the notch 31.

In this embodiment described above, the notches 31 and the tongues 32 of the inner annular portion 30*b* of the upper leaf spring 30 and the protrusions 80 formed on the end surface 8*d* of the holder 8 constitute a first means of the attachment means for engaging the inner annular portion 30*b* of the lower leaf spring 30 with the lower cylindrical end portion 8*b* of the holder 8 so that the inner annular portion 30*b* does not rotate with respect to the holder 8 in one of circumferential directions thereof. Further, the protruding portions 81 and the holding arms 83 in cooperation with the end surface 8*d* of the step 8*c* of the holder 8 constitute a second means of the attachment means for holding the inner annular portion 30*b* of the lower leaf spring 30 against the holder 8 so that the inner annular portion does not move in a direction parallel to the optical axis direction of the lens unit as well as does not rotate in the other circumferential direction in a state that the first means is in an engaged state.

Hereinbelow, referring to FIG. 6 to FIG. 9, description will be made with regard to the upper leaf spring 20, the stopper 3, and the holder 8. In this regard, it is to be noted that the upper leaf spring 20 is attached to the holder 8 by means of the attachment means. Further, please note that in FIG. 6 to FIG. 9, the upper leaf spring 20 is not shown in these drawings for clearly showing the engagement state between the stopper 3 and the holder 8. In the actual product, the inner annular portion 20*b* of the upper spring 20 is fixedly held between the bottom surface 3*b* of the stopper 3 (see FIG. 7) and the end surface of the upper cylindrical end portion 8*a* of the holder 8.

The upper leaf spring 20 has substantially the same structure as the lower leaf spring 30 (see FIG. 1). Specifically, the upper leaf spring 20 is formed from a thin metal plate made of beryllium copper through a punching process, and has the ring-shaped outer annular portion 20*a* and the ring-shaped inner annular portion 20*b* which is concentrically provided inside the outer annular portion 20*a* through a predetermined annular spacing 20*f*. The inner annular portion 20*b* is supported by the outer annular portion 20*a* through the bridge portions 20*c*. Each of the bridge portions 20*c* has an elongated arc-shape, and positioned inside the annular spacing 20*f* so that it extends along the inner periphery of the outer annular portion 20*a* and the outer periphery of the inner annular portion 20*b* through a predetermined angle.

The stopper 3 is a ring-shaped member made of a synthetic resin. And, as described above, the stopper 3 is provided for restricting upwardly excessive displacement of the holder 8 by the abutment with the bottom surface of the cover 2 when the holder is largely displaced. As described below, the stopper 3 is adapted to be engaged with the upper end cylindrical portion 8*a* of the holder 8 for fixedly attaching the upper leaf spring 20 to the holder 8.

The stopper 3 has an inner circumferential surface 3*a* in which three notches 3*c* are formed. Further, on the inner circumferential surface 3*a* the stopper 3, three steps 3*d* are formed in association with the respective notches 3*c* (see FIG. 7). The notches 3*c* and the steps 3*d* of the stopper 3 constitute engaging means of the present invention (that is, the engaging means of the ring-shaped member of the present invention.

On the upper cylindrical end portion 8*a* of the holder 8, three protruding pieces 88 are formed so as to protrude upwardly with the same spacing, and each of the protruding pieces 88 includes an engaging rib 89 extending horizontally from a tip part of the protruding piece 88. The protruding pieces 88 and engaging ribs 89 constitute engaged means of the present invention.

Next, description is made with regard to the operations for attaching the upper leaf spring 20 to the holder 8 by means of the stopper 3.

Figure 7:
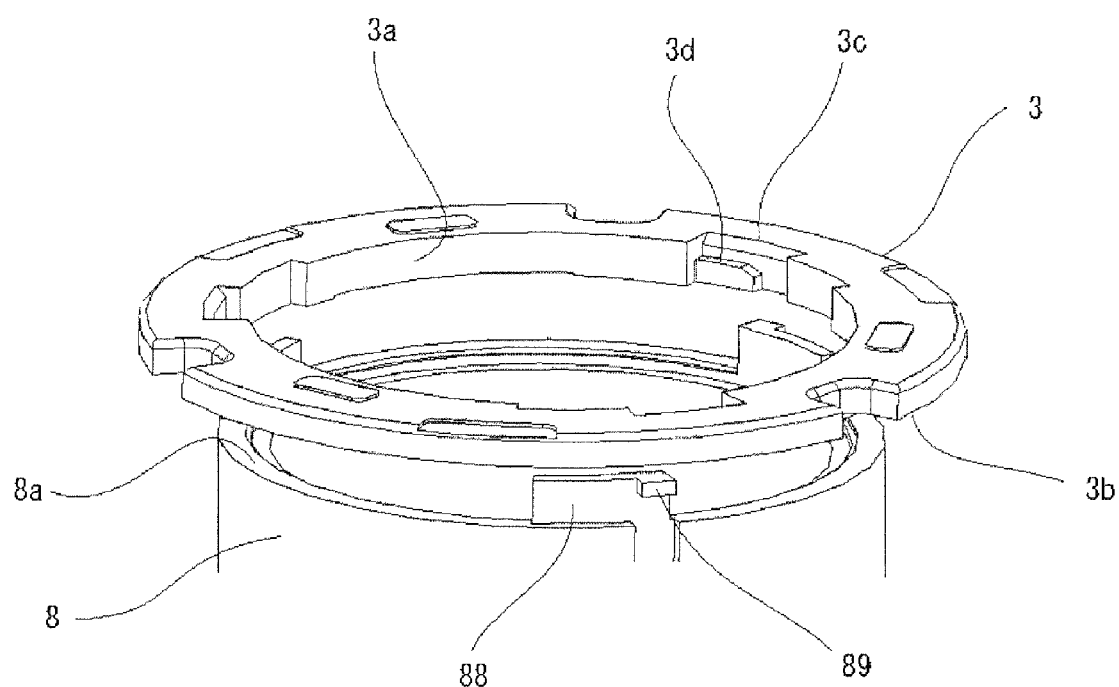
FIG. 7 is an enlarged perspective view which shows a state before the engagement of the holder 8 and the upper leaf spring 20 of the actuator assembly 1 of the camera module shown in FIG. 1. Note that that the upper leaf spring 20 is omitted from the figure for the purpose of clearly showing the engagement state between the stopper 3 and the holder 8.
Figure 8:
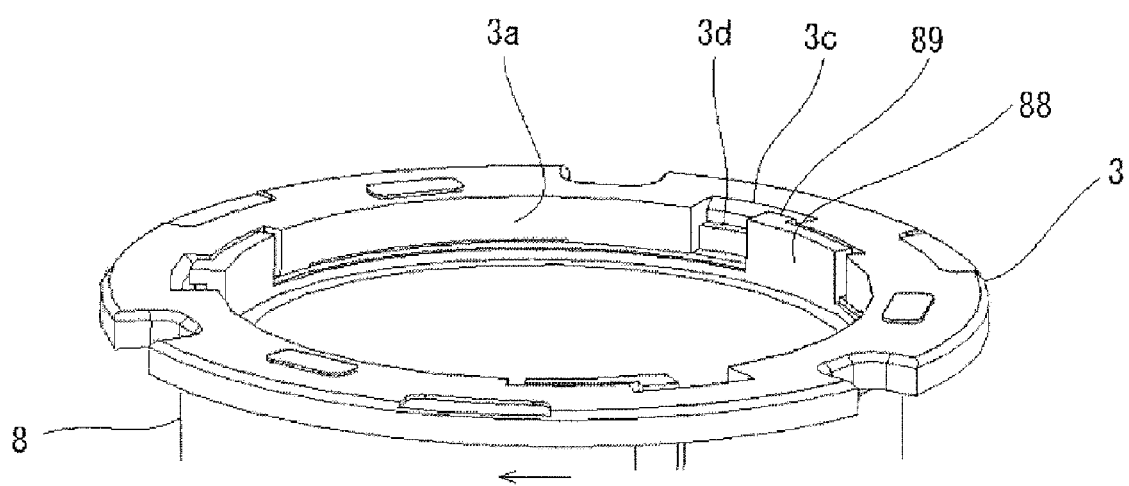
FIG. 8 is an enlarged perspective view which shows a state just before the engagement of the holder 8 and the upper leaf spring 20 of the actuator assembly 1 of the camera module shown in FIG. 1. Note that that the upper leaf spring 20 is omitted from the figure for the purpose of clearly showing the engagement state between the stopper 3 and the holder 8.
Figure 9:
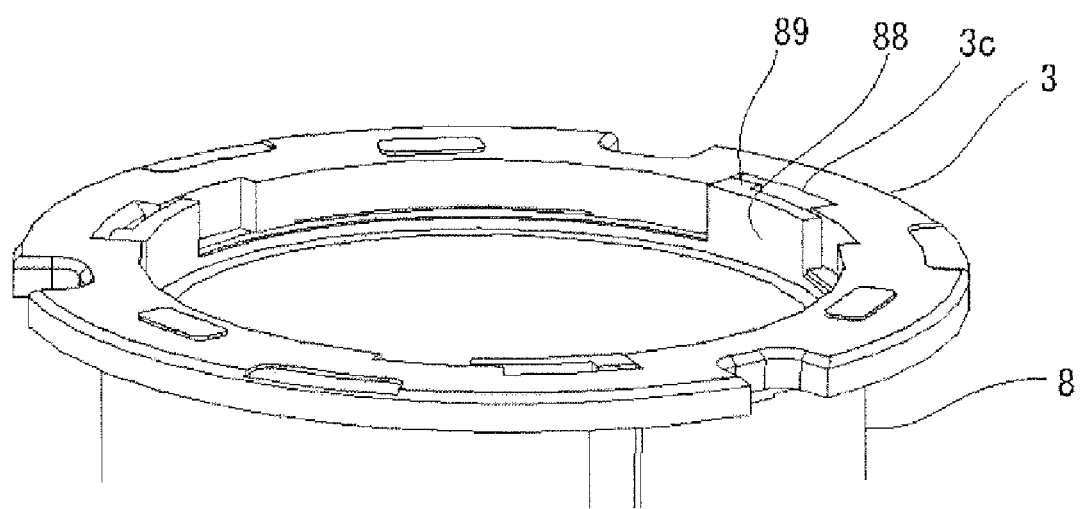
FIG. 9 is an enlarged perspective view which shows a state that the engagement of the holder 8 and the upper leaf spring 20 is established in the actuator assembly 1 of the camera module shown in FIG. 1. Note that that the upper leaf spring 20 is omitted from the figure for the purpose of clearly showing the engagement state between the stopper 3 and the holder 8.
Figure 10:
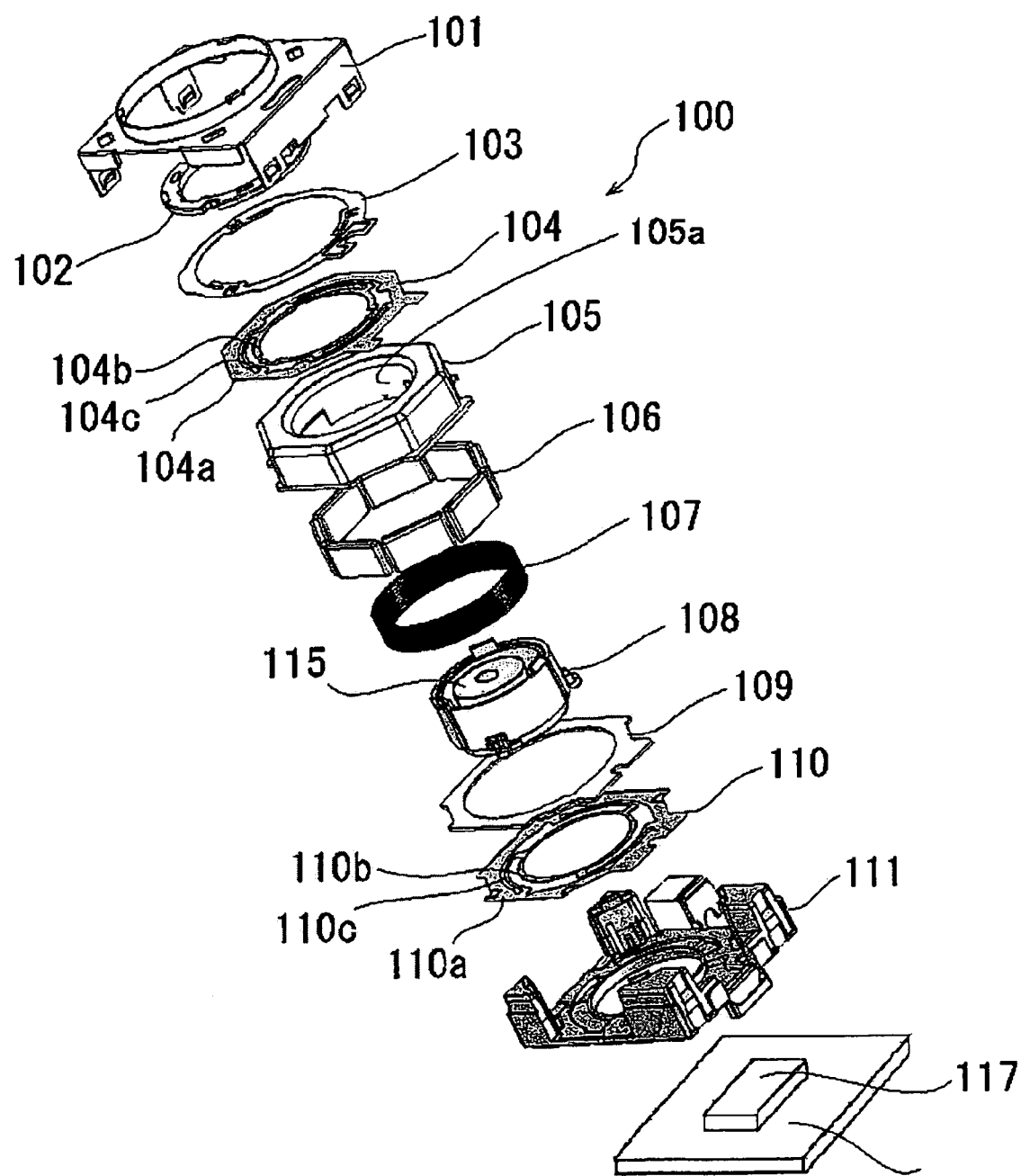
FIG. 10 is an exploded perspective view of an actuator assembly 100 of a conventional camera module.

First, the inner annular portion 20*b* of the upper leaf spring 20 is placed on the end surface of the upper cylindrical end portion 8*a* of the holder 8. Then, as shown in FIG. 7, the stopper 3 is placed onto the holder 8 from the upper side of the inner annular portion 20*b* of the upper leaf spring 20 which has been placed on the end surface of the upper cylindrical end portion 8a of the holder 8 so that the protruding pieces 88 with the engaging ribs 89 are received in the respective notches 3c of the stopper 3 with avoiding contact with the steps 3d. Next, the stopper 3 is rotated in a direction shown by the arrow in FIG. 8. According to the rotation of the stopper 3, an under surface of each engaging rib 89 is riding on an upper surface of the corresponding step 3d of the stopper 3. By rotating the stopper 3 further, each engaging rib 89 is completely engaged with the corresponding step 3d. Thereafter, as a final step, some portions of the stopper 3 are bonded to the holder 8 with a synthetic resin (adhesive) so that the stopper 3 cannot be rotated. In this way, the upper leaf spring 20 is fixedly held between the stopper 3 and the holder 8. In this regard, please note that this partial bonding is different from the bonding carried out in the conventional camera module where the upper leaf spring 20 is directly bonded to the holder 8 using an adhesive.

In this embodiment described above, the attachment means comprises the stopper 3 (ring-shaped member) detachably attached to the upper cylindrical end portion 8a of the holder 8, and the stopper 3 is configured so that that the inner annular portion 20a of the upper leaf spring 20 is fixedly held between an end surface of the upper cylindrical end portion 8a of the holder 8 and an inner surface of the stopper 3 when the stopper 3 is attached to the upper cylindrical end portion 8a of the holder 8. In more detail, the stopper 3 has plurality of engaging means formed on the inner circumferential surface thereof, and the lower cylindrical end portion 8a of the holder 8 has a plurality of engaged means to which the engaging means of the stopper 3 are engaged by rotating the stopper 3. More specifically, the engaging means includes the notches 3c formed in the circumferential surface 3a of the stopper 3 and steps 3d provided in association with the respective notches 3c, and the engaged means includes protruding pieces protruding upwardly from the upper cylindrical end portion 8a of the holder 8 and engaging ribs 89 extending from tip portions of the respective protruding pieces 88, wherein the notches receive the respective protruding pieces 88 with the engaging ribs 89 when the stopper 3 is placed onto the upper end cylindrical portion of the holder 8, and then by rotating the stopper 3 in a predetermined direction the engaging ribs 89 are engaged with the respective steps 3d.

As described above, according to the camera module of the embodiment described above, the lower leaf spring 30 can be fixedly attached to the holder 8 only by rotating the lower leaf spring 30 with respect to the holder 8 in a state that the inner annular portion 30b of the lower spring 30 is fitted onto the small cylindrical portion 8e of the step portion 8c and supported on the end surface 8d. Therefore, since the bonding operating using a synthetic resin that was performed in the conventional camera module can be omitted, it is possible to shorten a time necessary for manufacturing a camera module. Further, since the lower spring 30 can also be attached to the holder 8 without using an adhesive, it is possible to prevent the lower spring 30 from being peeled off due to an imperfect bonding state thereof.

Further, according to the camera module of the embodiment described above, the upper leaf spring 20 can also be fixedly attached to the holder 8 only by rotating the stopper 3 with respect to the holder 8 in a state that the inner annular portion 20b is held between the stopper 3 and the end surface of the upper cylindrical end portion 8a of the holder 8. Therefore, since the bonding operating using a synthetic resin that was performed in the conventional camera module can also be omitted, it is possible to shorten a time necessary for manufacturing a camera module. Further, since the inner annular portion 20b is held between the stopper 3 and the end surface of the upper cylindrical end portion 8a of the holder 8, it is not necessary to apply rotational force directly to the upper leaf spring 20 which is made of a thin metal plate when it is attached to the holder 8. Therefore, it is possible to prevent stress deformation is caused in the upper leaf spring 20 during the attachment operation thereof.

Further, in the camera module of this embodiment, the stopper 3 which is provided for restricting excessive displacement of the holder 8 is used as the ring-shaped member for attaching the upper leaf spring 20, no additional part is required and thus a number of parts is not increased.

Finally, it should be understood that the present invention is not limited to the preferred embodiment described hereinabove and, needless to say, a variety of modifications or variations may be made without departing from the scope of the invention defined in the following claims. For example, after the lower spring 30 fixedly attached to the holder 8 as described above, some parts of the lower spring 30 may be bonded to the holder for obtaining more reliable bonding state.

Further, it is also to be understood that the present disclosure relates to subject matter contained in Japanese Patent Application No. 2006-236885 (filed on Aug. 31, 2006) which is expressly incorporated herein by reference in its entirety.

What is claimed is:

1. A camera module, comprising:
   a lens unit which constitutes an optical system of the camera module;
   a holder which houses the lens unit and is displaceable along an optical axis direction of the lens unit, the holder having a cylindrical shape having upper and lower cylindrical end portions;
   a coil provided on the holder;
   a yoke and magnets provided on the yoke for providing a magnetic field to the coil;
   upper and lower leaf springs for supporting the holder so that the holder is displaceable along the optical axis direction of the lens unit, each of the upper and lower springs including an outer annular portion, an inner annular portion provided inside the outer annular portion and attached to the lower cylindrical end portions of the holder, and a plurality of bridge portions coupled between the outer annular portion and the inner annular portion for displaceably supporting the inner annular portion with respect to the outer annular portion, each of the bridge portions having an inner annular portion side end portion coupled to an outer periphery of the inner annular portion; and an imaging element provided below the lens unit;
   wherein at least one of the inner annular portions of the upper and lower leaf springs are respectively attached to the corresponding cylindrical end portions of the holder through first and second attachment means, in which each of the first and second attachment means is configured so that the inner annular portion is mechanically engaged with and attached to the cylindrical end portion of the holder,
   the inner annular portion of the lower leaf spring is attached to the lower cylindrical end portion of the holder through the first attachment means, wherein the first attachment means comprises: a first means for engaging the inner annular portion of the lower leaf spring with the lower cylindrical end portion of the holder so that the inner annular portion does not rotate with respect to the holder in one of circumferential directions thereof, and a second means for holding the inner annular portion of the lower leaf spring against the holder so that the inner annular portion does not move in a direction parallel to the optical axis direction of the lens unit as well as does not rotate in the other circumferential direction in a state that the first means is in an engaged state, and wherein the inner annular portion of the upper leaf spring is attached to the upper cylindrical end portion of the holder through the second attachment means, wherein the second attachment means comprises: a ring-shaped member detachably attached to the upper cylindrical end portion of the holder, and the ring-shaped member is configured so that that the inner annular portion of the upper leaf spring is fixedly held between an end surface of the upper cylindrical end portion of the holder and an inner surface of the ring-shaped member when the ring-shaped member stopper is attached to the upper cylindrical end portion of the holder.

2. The camera module as claimed in claim 1, wherein the lower cylindrical end portion of the holder is formed with a step so as to form a small cylindrical portion for receiving the inner annular portion and an end surface for supporting an upper surface of the inner annular portion opposing to the end surface of the step, wherein the first means includes notches and tongues formed in the outer periphery of the inner annular portion of the lower leaf spring and protrusions formed on the end surface of the lower cylindrical end portion so as to be engageable with the respective tongues by rotating the lower leaf spring, and wherein the second means includes holding means provided on the lower cylindrical end portion of the holder for holding the inner annular portion side end parts of the respective bridge portions of the leaf spring from the bottom thereof in a state that the upper surface of the inner annular portion is supported on the end surface of the step and for restricting further rotation of the lower leaf spring in a state that the protrusions are engaged with the tongues.

3. The camera module as claimed in claim 2, wherein each of the protrusions has a slant surface for raising the tongue according to the rotation of the lower leaf spring, and each of the holding means includes a protruding portion formed on the outer circumferential surface of the lower cylindrical end portion and a holding arm horizontally protruding from a tip part of the protruding portion for holding the inner annular portion side end part of the bridge portion of the lower leaf spring.

4. The camera module as claimed in claim 1, wherein the ring-shaped member has an inner circumferential surface, wherein the inner circumferential surface of the ring-shaped member is formed with a plurality of engaging means, and the upper cylindrical end portion of the holder has a plurality of engaged means to which the engaging means of the ring-shaped means are engaged by rotating the ring-shaped member with respect to the holder.

5. The camera module as claimed in claim 4, wherein the engaging means includes notches formed in the circumferential surface and steps provided in association with the respective notches, and the engaged means includes protruding pieces protruding upwardly from the upper cylindrical end portion of the holder and engaging ribs extending from a tip part of the protruding piece, wherein the notches receive the protruding pieces with the engaging ribs when the ring-shaped member is placed onto the upper cylindrical end portion of the holder, and then by rotating the ring-shaped member in a predetermined direction the engaging ribs are engaged with the respective steps.

6. The camera module as claimed in claim 1, wherein the ring-shaped member is a stopper for restricting excessive displacement of the holder in an upward direction.

* * * * *